March 10, 1931.　　　H. S. COVER　　　1,795,425
BINOCULAR OPTICAL INSTRUMENT
Filed July 12, 1928　　2 Sheets-Sheet 1

Witnesses:
K. W. Fischer
F. C. Appleton

Inventor:
Harvey, S. Cover.
By Joshua R. H. Folk
His Attorney.

March 10, 1931. H. S. COVER 1,795,425
BINOCULAR OPTICAL INSTRUMENT
Filed July 12, 1928 2 Sheets-Sheet 2
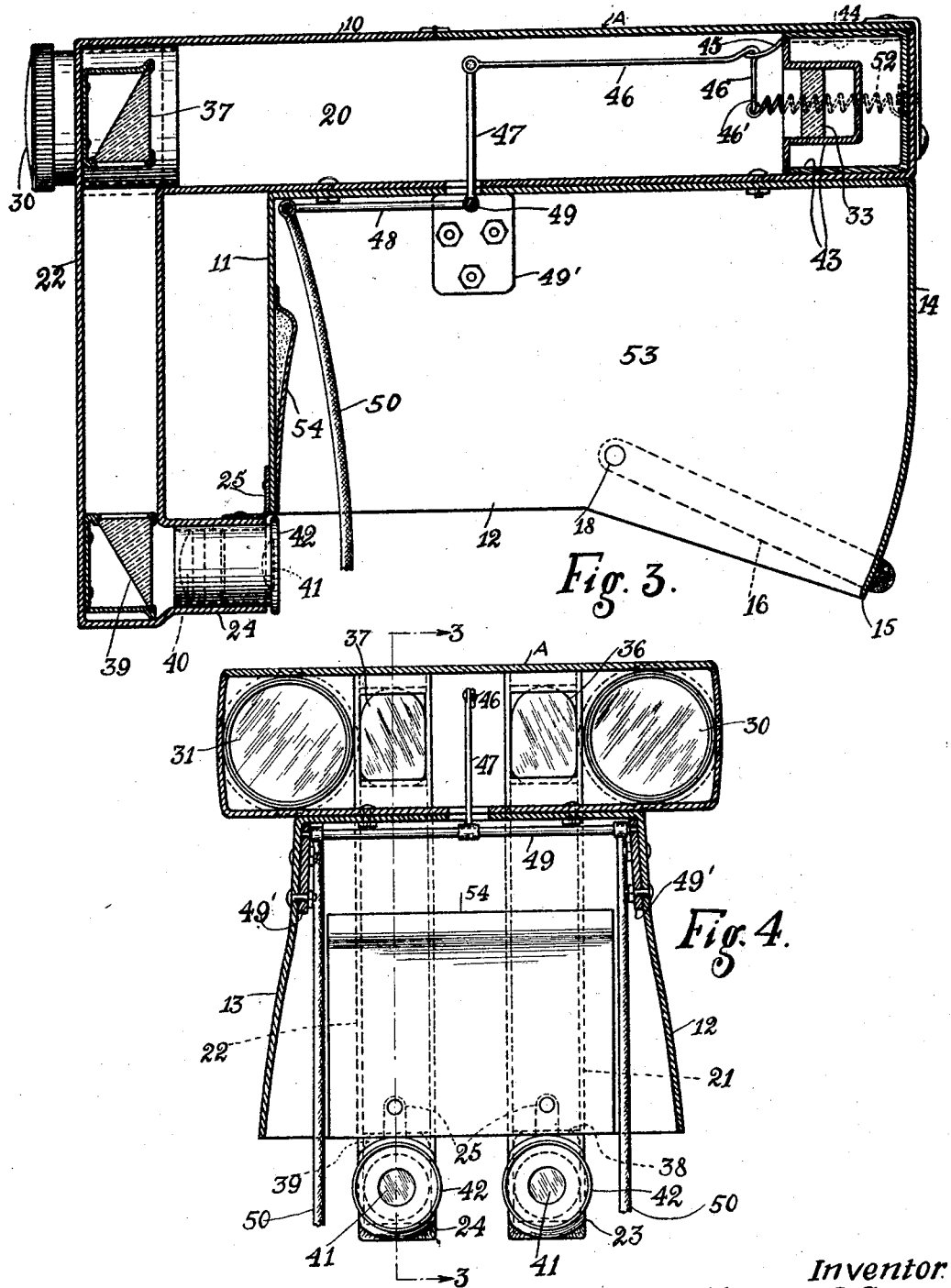
Inventor.
Harvey, S. Cover.
By Joshua R H Potts
His Attorney.
Witnesses:

Patented Mar. 10, 1931

1,795,425

UNITED STATES PATENT OFFICE

HARVEY S. COVER, OF SOUTH BEND, INDIANA

BINOCULAR OPTICAL INSTRUMENT

Application filed July 12, 1928. Serial No. 292,246.

My present invention relates to binocular optical instruments, and more particularly to binocular instruments incorporating in a modified form the advantages and conveniences set forth in my device described in copending application No. 292,245, filed July 12, 1928, for improvements in optical instruments.

The chief object of this invention is to provide a binocular optical instrument of comparatively high magnifying power in a novel form providing the maximum of comfort, convenience and efficiency.

Another object is to provide a binocular optical instrument in the form of a head box or helmet to be worn on the head, with novel means independent of the hands for focusing the optical system to accommodate the vision of the user.

A further object is to provide a binocular optical instrument adapted to convey rays of light from a plane above the level of the eye by periscopic means to the eyes of the user of this instrument.

Other objects and advantages of the construction and mode of operation of the device herein described will appear more fully in the hereinafter specification, when taken in connection with the accompanying drawings in which, Figure 1 is a side elevational view of the device.

Figure 3 is a longitudinal sectional view taken on line 3—3 of Figure 4.

Figure 4 is a cross sectional view taken on line 4—4 of Figure 1.

Figure 1:
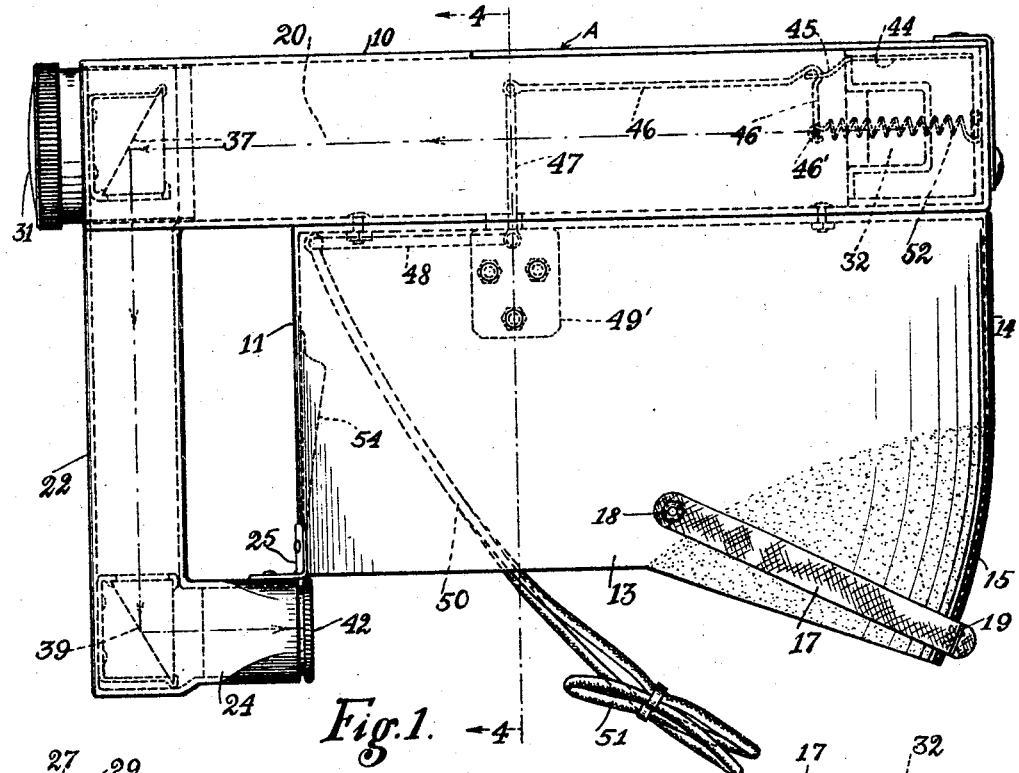
Figure 2:
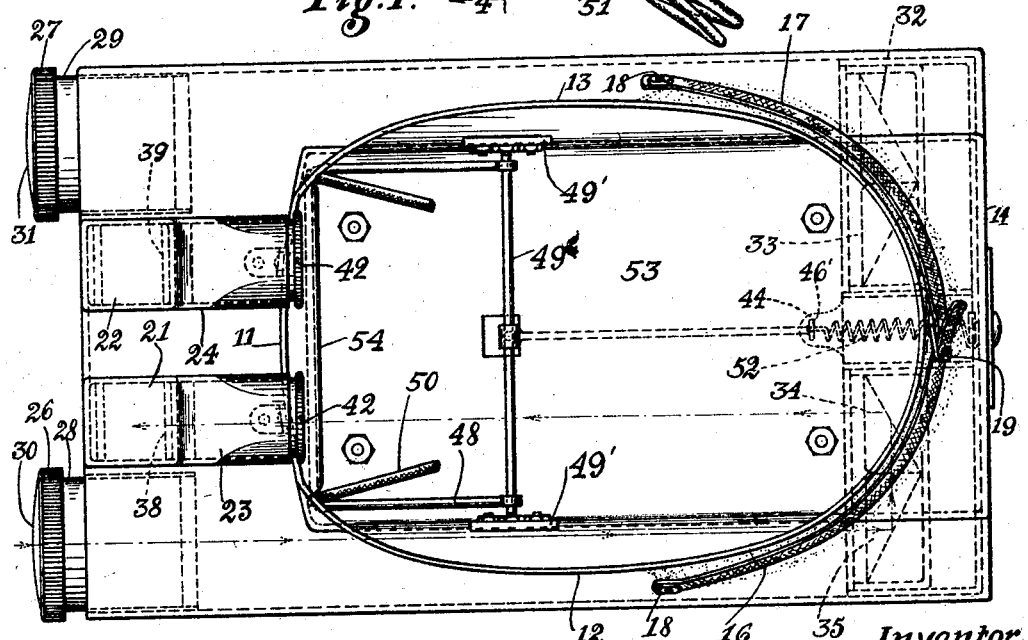
Figure 2 is a bottom plan view thereof.

With more particular reference to the drawings of the preferred form of my invention, A designates a head box or helmet of fabricated, or other suitable material, the head box comprising a top wall 10, a front wall 11, side walls 12, 13, and a rear wall 14, which latter is provided with an inwardly curving, flexible extension 15. A pair of elastic bands 16, 17 secured by rivets or bolts 18 to the side walls 12, 13 and joined by an adjustable buckle 19, co-operate with the flexible extension 15 in retaining the head box securely on the head, whereby the device, and consequently the telescope therein, is prevented from tilting.

Horizontally secured to the top wall or roof 10 of the head box is a casing 20, having a pair of downwardly projecting tubular periscopic extensions 21, 22, secured at right angles thereto, the downwardly projecting extensions having inwardly projecting short extensions 23, 24 which are secured to the front wall 11 by brackets 25.

The casing 20 and the extensions form a container for a periscopic, prismatic, binocular telescope. In the caps 26, 27, threaded on slidable collars 28, 29, are plano-convex lenses 30, 31, through which rays of light are directed through pairs of reflecting prisms 32, 33, 34, 35 in the direction shown by the dotted arrows, the rays of light being reversed and caused to travel back to the single prisms 36, 37, whence they are reflected downwardly at right angles to the prisms 38, 39, and then reflected at right angles through the lenses 40, 41, of the oculars 42, which are of the conventional Huygens type.

The prisms 32, 33, 34, 35, are mounted in a in a slidable frame 43 to the top of which is fastened the plate 44 having an integral bend 45, connected to a link 46 pivotally mounted on an upwardly extending arm 47 of a bell crank lever yoke 48, integral with a fulcrum rod 49, pivotally mounted in metal plates 49' secured to the sides 12, 13. A cord 50 connected to the bell crank and having a loop 51 adapted to be passed over the jaw of the wearer, serves as a means to rock the bell crank and consequently to move the link 46 longitudinally thereby drawing the frame 43 containing the prisms 32, 33, 34, 35, against the tension of the coil spring 52 which is secured to the back wall of the casing 20 at one end, and at the other end to a downwardly projecting bent part 46' of the link 46.

By suitably manipulating the bell crank by means of cord 50 with the jaw, which may be done when the device is placed on the head, and the chin placed in the loop 51, it will be observed that the slidable frame 43 and the prisms therein may be shifted backward and forward in a manner to vary the focal length and, consequently, the magnifying power of the present device, to meet the requirements of different individuals. This adjustment feature is quite convenient in that it affords an almost instantaneous means of securing the correct focus for different eyesight, and at greater or less distances. In the compartment 53 which receives the head, and on the front wall thereof, I provide a wedge-shaped shelf 54 which, in conjunction with the flexible strap on the back wall and the bands on the side wall, serve to retain the device securely on the head, and also to prevent tilting, this being in the case of optical instruments a consideration of high importance.

The function and general operation of the device has been in part indicated by the foregoing description, but will be made more fully apparent by the following explanation:

To make use of the device, the eyes are applied to the oculars 42, and the head box is then drawn over the head in the manner of a hat, the flexible back wall and the elastic bands, as pointed out above, retaining the device securely upon the head of the wearer. The loop 51 will now be passed over the jaw after which a correct focus on objects of varying distances may be almost immediately attained by slightly moving the jaw, thereby angling the bell crank in a manner to cause the frame 43 containing the lenses to move. Inasmuch as any movement, forward or backward, of the prisms in the slidable frame results in a two-fold movement of the light beams by reason of the increased or decreased length of travel in a forward or backward direction of the incident light rays, it will be perceived that the slightest movement of the jaw will entail a substantial change of focus. Only the slightest pressure and movement of the jaw being required, no fatigue will be experienced in this respect over long spaces of time. The collars 28, 29 on which the lens-containing caps are mounted, being slidable in casing 20, an additional means of changing the focus of the device is provided.

Since the object glasses 30, 31 are at a level higher than the eyes of the wearer of the device, a periscopic system is employed in the present invention, the advantages residing in this mode of observation, whenever it is desirable that the user of the device maintain his position hidden, being self-evident in military use, hunting, etc. When it is desired to use both eyes for natural vision, this may be done by merely tilting the head box upwardly.

Among the optical advantages to be obtained by the employment of the construction and method herein indicated, may be mentioned the fact that by reason of the unusually long path of the light rays from the object glasses to the ocular, the focal length of the object glasses is prolonged over a path several times as great as in the well known conventional prism binoculars. As the magnifying power of any optical system is a function of its focal length, it will be seen that in the provision of the present comparatively great focal length I have achieved an optical instrument of great magnifying power.

In the instrument herein described and illustrated, images are presented to the beholder in the same manner as in the terrestrial telescope, that is, the images are upright. Converging rays of light directed through the object glasses, as shown in the dotted lines and arrows, after passing through the prisms in the slidable frame are reversed in position and direction, thence are reflected through the single prisms 36, 37, and thence downwardly to prisms 38, 39,— the last pairs of prisms again effecting a complete reversal of direction of the light rays and an interchange of the two sides of the projected image which at this point is inverted,—the negative Huygens oculars now reversing and presenting the image erect to the eyes. Since the terrestrial type of telescope offers all the advantages of the astronomical or inverted type of telescope, with the additional convenience that it may be used for marine or land surveying purposes, the terrestrial type is preferred, although it will merely be necessary to substitute a positive Ramsden type of ocular to convert the instrument to the astronomical telescope.

It should be noted that the optical instrument herein described may be worn conveniently on the head for as many hours as an individual is ordinarily accustomed to wearing a hat, in addition to which, the head is much less susceptible to trembling or movements which, in the case of hand supported movements, renders observation of remote objects at high magnification difficult. An observer also may now, by means of the periscopic feature alluded to above, make observations without direct exposure of his person, a highly desirable feature in hunting and military use.

While I have in the present description and disclosure set forth with particularity a preferred form of construction, it will be understood the device is susceptible of wide modification and change. The head box or helmet, for example, which in the drawings has been shown as of a square configuration, with the optical system secured to the top thereof, may be made to resemble a conventional helmet or stiff hat, the optical system being completely hidden therein. I do not wish, therefore, to be confined to the exact details as set forth, but desire to avail myself of such variations and modifications as fairly fall within the scope of the appended claims.

What I claim as new and desire to secure by Letters Patent is:

1. A binocular optical instrument comprising a helmet to be worn on the head, said helmet having object glasses mounted for variable adjustment of the focus thereof, oculars registering with the eyes of the wearer of the helmet, means to convey light rays periscopically from the object glasses through said oculars, and additional face operated means independent of the use of the hands to vary the focus and magnifying power of said binocular instrument.

2. A binocular instrument comprising a helmet to be worn on the head, said helmet having slidably adjustable object glasses providing means for varying the focal length and consequently the magnifying power of the instrument, additional means operated by the jaw of the wearer of said helmet to vary the focal length of the object glasses, said additional means comprising a jaw operated flexible element connected to a bell crank lever having link connection to said additional means whereby when the jaw of the wearer is moved, the link will be longitudinally reciprocated by the bell crank to advance or retire the said additional means to and from the object glass for variation of the focus thereof, and flexible means to retain the helmet conveniently on the head of the wearer.

3. A binocular optical instrument of the character described comprising, in combination, a supporting helmet adapted to be worn upon the head of the observer, substantially parallel longitudinally extending tubular members mounted upon said helmet, object lenses disposed adjacent the forward extremities of said tubular members, total reflecting prisms slidably mounted adjacent the rearward extremities of said tubular members and positioned in a vertical plane normally to the rear of the eyes of the observer, ocular lenses adapted to convey light rays reflected from said total reflecting prisms to the eyes of the observer, and operating means connected to said total reflecting prisms and engageable by the jaw of the observer for adjusting the focus by changing the position of said total reflecting prisms by movement of the jaw.

4. A binocular optical instrument of the character described comprising, in combination, a supporting helmet adapted to be worn upon the head of the observer, substantially parallel longitudinally extending tubular members mounted upon said helmet, object lenses disposed adjacent the forward extremities of said tubular members, total reflecting prisms slidably mounted adjacent the rearward extremities of said tubular members and positioned in a vertical plane normally to the rear of the eyes of the observer, ocular lenses adapted to convey light rays reflected from said total reflecting prisms to the eyes of the observer, mechanism for normally urging said total reflecting prisms in one direction, and operating means connected to said prisms and engageable by the jaw of the observer for shifting the position of said prisms in an opposite direction for focusing purposes by movement of the jaw.

5. A binocular optical instrument of the character described comprising, in combination, a supporting helmet adapted to be worn upon the head of the observer, substantially parallel longitudinally extending tubular members mounted upon said helmet, object lenses disposed adjacent the forward extremities of said horizontally extending tubular members, total reflecting prisms slidably mounted adjacent the rearward extremities of said horizontally extending tubular members and positioned in a vertical plane normally to the rear of the eyes of the observer, substantially vertically extending tubular members mounted adjacent the forward extremities of said horizontally extending members, right angle reflecting prisms mounted adjacent the upper extremities of said vertically extending tubular members, ocular lenses mounted adjacent the lower extremities of said vertically extending members, and operating means connected to said total reflecting prisms and engageable by the jaw of the observer for adjusting the focus by changing the position of said total reflecting prisms by movement of the jaw.

6. A binocular optical instrument of the character described comprising, in combination, a supporting helmet adapted to be worn upon the head of the observer, substantially parallel longitudinally extending tubular members mounted upon said helmet, object lenses disposed adjacent the forward extremities of said horizontally extending tubular members, total reflecting prisms slidably mounted adjacent the rearward extremities of said horizontally extending tubular members and positioned in a vertical plane normally to the rear of the eyes of the observer, substantially vertically extending tubular members mounted adjacent the forward extremities of said horizontally extending members, right angle reflecting prisms mounted adjacent the upper extremities of said vertically extending tubular members, ocular lenses mounted adjacent the lower extremities of said vertically extending members, mechanism for normally urging said total reflecting prisms in one direction, and operating means connected to said prisms and engageable by the jaw of the observer for shifting the position of said prisms in an opposite direction for focusing purposes by movement of the jaw.

7. A binocular optical instrument of the character described comprising, in combination, a supporting helmet adapted to be worn upon the head of the observer, substantially parallel longitudinally extending tubular members mounted upon said helmet, object lenses disposed adjacent the forward extremities of said tubular members, total reflecting prisms slidably mounted adjacent the rearward extremities of said tubular members and positioned in a vertical plane normally to the rear of the eyes of the observer, ocular lenses adapted to convey light rays reflected from said total reflecting prisms to the eyes of the observer, operating means connected to said total reflecting prisms and engageable by the jaw of the observer for adjusting the focus by changing the position of said total reflecting prisms by movement of the jaw, said helmet provided with a flexible portion for adapting said helmet to different sized heads.

8. A binocular optical instrument of the character described comprising, in combination, a supporting helmet adapted to be worn upon the head of the observer, substantially parallel longitudinally extending tubular members mounted upon said helmet, object lenses disposed adjacent the forward extremities of said horizontally extending tubular members, total reflecting prisms slidably mounted adjacent the rearward extremities of said horizontally extending tubular members and positioned in a vertical plane normally to the rear of the eyes of the observer, substantially vertically extending tubular members mounted adjacent the forward extremities of said horizontally extending members, right angle reflecting prisms mounted adjacent the upper extremities of said vertically extending tubular members, ocular lenses mounted adjacent the lower extremities of said vertically extending members, operating means connected to said total reflecting prisms and engageable by the jaw of the observer for adjusting the focus by changing the position of said total reflecting prisms by movement of the jaw, said helmet provided with a flexible portion for adapting said helmet to different sized heads.

9. An optical instrument of the character described comprising, in combination, a supporting helmet adapted to be worn upon the head of the observer, a casing mounted in the upper portion of said helmet, an object lens mounted adjacent the forward portion of said casing, a total reflecting prism mounted adjacent the rear portion of said casing and positioned in a vertical plane normally to the rear of the eyes of the observer, an ocular lens mounted adjacent the forward portion of said casing, prism means for reflecting rays of light from said total reflecting prism to said ocular lens, and a flexible member operatively connected to one of said prisms or lenses and engageable by the jaw of the observer for adjustment of the focus by movement of the jaw.

10. An optical instrument of the character described comprising, in combination, a supporting helmet adapted to be worn upon the head of the observer, a casing mounted in the upper portion of said helmet, an object lens mounted adjacent the forward portion of the said casing, a total reflecting prism mounted adjacent the rear portion of said casing and positioned in a vertical plane normally to the rear of the eyes of the observer, an ocular lens mounted adjacent the forward portion of said casing, prism means for reflecting rays of light from said total reflecting prism to said ocular lens, and a member operatively connected to said instrument for changing the focus and engageable by the jaw of the observer whereby the focus of the instrument may be changed upon movement of the jaw.

In testimony whereof I have signed my name to this specification.

HARVEY S. COVER.